J. Davis.
Car Brake.
No. 3532 Reissued July 6, 1869.
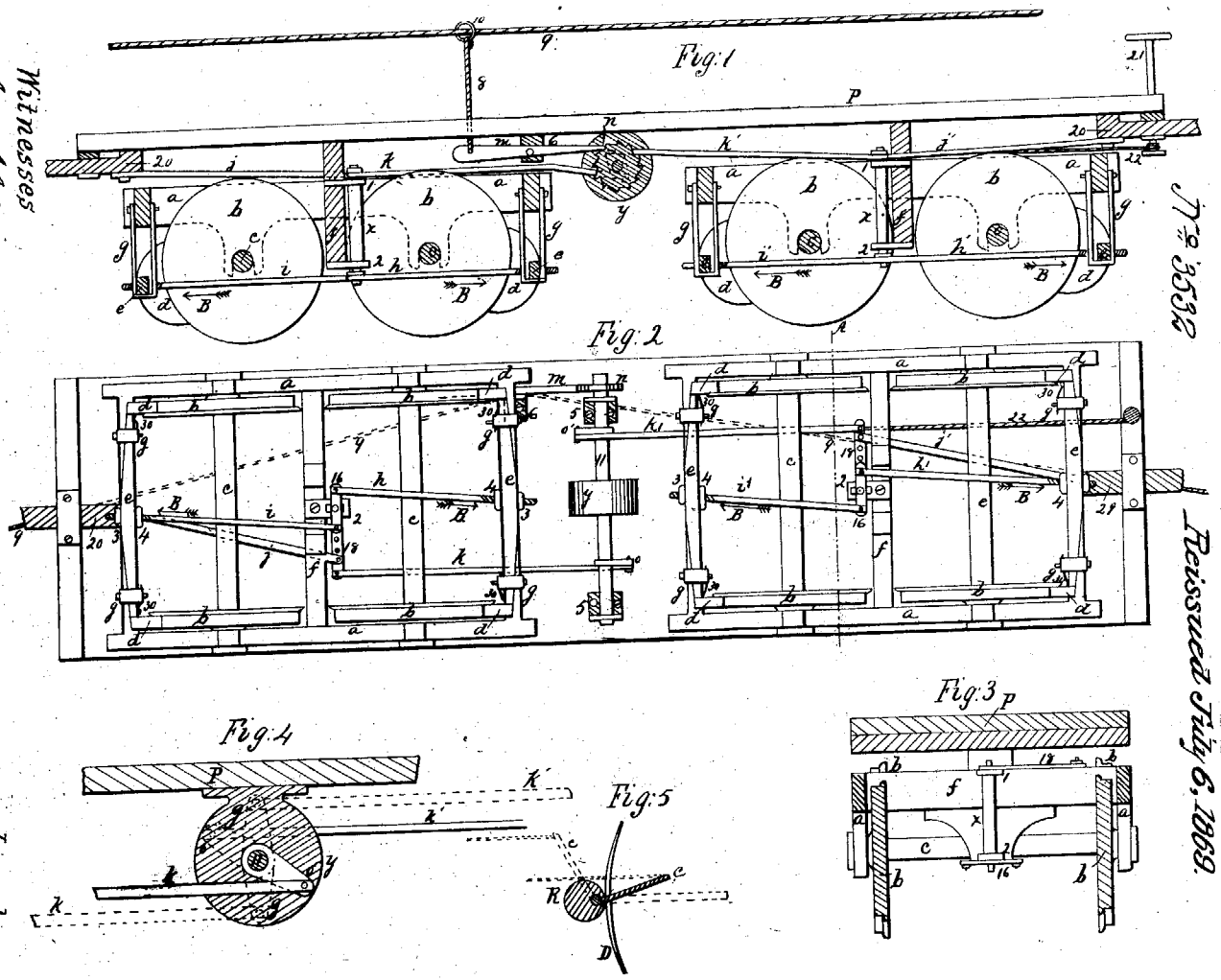
Witnesses
James J. Johnston
James McBride
Inventor
John Davis

United States Patent Office.

JOHN DAVIS, OF ALLEGHENY CITY, PENNSYLVANIA.

*Letters Patent No.* 55,067, *dated May* 29, 1866; *reissue No.* 3,532, *dated July* 6, 1869.

IMPROVED RAILWAY-CAR BRAKE.

The Schedule referred to in these Letters Patent and making part of the same.

*To all whom it may concern:*

Be it known that I, JOHN DAVIS, of the city and county of Allegheny, in the State of Pennsylvania, have invented a certain new and useful Improvement in Car-Brakes; and I do hereby declare that the following is a full and exact description thereof, reference being had to the accompanying drawings, and to the letters of reference marked thereon.

The nature of my invention consists in applying brakes to the wheels of railroad-cars, so that the said brakes are made operative by the motion, action, and inaction of the locomotive and cars, whether said motion or action is given by the motive-power while travelling on a level track, or by the motive-power or the gravity of the cars on inclined planes of the track, said brakes always operating, with relation to the wheels, so that they will adjust themselves, and bring the proper force to bear on the wheels, when the locomotive becomes inoperative from any cause, or from any undue or improper motion or action imparted to the cars, the whole being constructed, arranged, and operating in the manner hereinafter described.

In the accompanying drawings—

Figure 1 represents a longitudinal section of a car-truck, furnished with my improvement in brakes.

Figure 2 represents a car-truck inverted, and represents the general arrangement of the various parts used in my improvement in car-brakes.

Figure 3 represents a transverse section of the car-truck, cut through at line A. (See fig. 2.)

Figure 4 represents a section of the car-truck, showing the position of the brakes of the spring-shaft, when the brakes are on and off the wheels.

Figure 5 represents a combination of a cam and lever, which can be used, in combination with an elliptic spring, as a substitute for the coil-spring and spring-shaft herein described.

In the accompanying drawings—

*a* represents the truck-frame.

*b* represents the wheels.

*c* represents the axles.

*d* represents the brakes.

*e* represents the brake-bars.

*g* represents the stirrups, in which are suspended the brake-bars *e*.

20 and 29 represent the draw-heads or buffers.

P represents the floor or the bottom of the car-body.

All of these parts are of ordinary construction.

To the cross-bar *f* of the truck-frame *a* are secured two bearings, marked 1 and 2, which support the perpendicular shafts marked *x*, on the upper end of which are secured levers marked 18, and to the lower end are secured levers marked 10, to which are attached rods marked *i* and *h* and *i'* and *h'*.

The rods marked *j* and *j'* are secured to the draw-heads or buffers 20 and 29, and the rods marked *k* and *k'* are secured to cranks *o* and *o'*, on the spring-shaft marked 11, which is held in the desired position by means of hangers marked 5, which are secured to the bottom P of the car-body.

To the spring-shaft 11 is attached a coil-spring, in case *y*, which is secured to the bottom of the car-body.

One end of the coil-spring being attached to the spring-shaft 11, and the other end to the side of the case *y*, on the end of the spring-shaft 11 is placed ratchet-wheel marked 22, which is connected with a pawl marked *m*, which is secured to the bottom of the car, and is used for holding the brakes off the wheels, when so desired.

To the end of the pawl *m* is attached a cord, 8, which passes up the side of the car-body.

On the upper end of the cord 8 is a ring marked 10, through which passes a cord marked 9, which passes out through the ends of the car, with the bell-rope, to the locomotive, so as to be under the control of the engineer.

The lower ends of the shafts *x* are placed in a slot made in the bearings, marked 2, so that the shaft *x* can move back and forward with the movements of the brakes.

The brakes marked *d* are held a uniform distance from the wheels, by the springs 30, which are secured to the bars *e*, and press against the stirrups *g*.

The combination of the cam R and levers C with the elliptic spring D, (seen in fig. 5,) can be readily substituted for the coil-spring shaft 11 and cranks *o* and *o'*, as represented in figs. 1, 2, and 3, and about the same result obtained as that which results from the use of coil-spring shaft and cranks; therefore, I do not confine myself to the use of the coil-spring shaft and cranks, for operating the rods, levers, and brakes.

The ordinary manner of suspending the brake-bar *e*, is to place in the bar *e*, near each end of it, a bolt, provided with ring or "eye," into which is looped one end of a round bar of iron, of suitable length, and the other end of said bar is looped in a ring of a bolt secured in the frame *a* of the car-truck.

Another method of suspending the brake-bars *e* is to suspend them to the frame of the truck, by means of flat bars of iron.

Both of these methods are objectionable, for if either of the bars used for suspending brake-bars *e* should break off, or otherwise become detached, (which is often the case,) then the brake-bars *e* will drop down on the track, and are very liable to throw the car or train off its track, causing a "smash-up," accompanied often by great loss of life and injury of passengers, and always with a loss of property.

Now, by suspending the brake-bars *e*, in stirrups *g*, as shown in the accompanying drawings, the brake-bars *e* will be more securely suspended to the frame of the truck, and the liability of accidents caused by the brake-bars *e* dropping down on the track, is avoided.

The construction and arrangement of the several parts will readily be understood by reference to the drawings; therefore, I will proceed to describe the operation of my invention.

Having the various parts constructed and arranged, as herein described and represented, I adjust the brakes to the wheels by means of the screw-nuts 3 and 4. I then turn the shafts 11 until the coil-spring has sufficient tension to hold the brakes on the wheels with the force desired.

I then attach the rods *k* and *k'* to the crank or levers *o* and *o'*, on the shaft 11. I then couple the cars and the locomotive together in the usual manner.

Now, by coupling the locomotive to the buffer or draw-heads, marked 20, the draught of the locomotive will draw forward the rods *j* and *k* and the crank *o*, which will force back the crank *o'* and rods *k'* and *j'*, which movements of rods and cranks will move the levers marked 18, which will turn the shaft *x* and lever 16, which will move the rods *i* and *h* and *o'* and *h'*, in the direction indicated by the arrows marked B, and thereby force the brakes from off the wheels.

When the drawing-power is attached to the draw-head or buffer marked 29, then the draught will draw forward the rods *j'* and *k'* and the crank *o'*, which will force back the rods *k* and *j* and crank *o*, which will operate the levers 18 and 16, which will move the rods *i i'* and *h h'* in the direction indicated by the arrows B, and thereby force the brakes from off the wheels.

When I desire to take the brakes off, and hold them off, a forward motion is given to the locomotive, which will draw forward the draw-heads or buffers, and operate the rods, cranks, and levers in the manner described, which will take the brakes off.

I then draw the cord marked 9 forward, which will cause it to approach a straight line, and thereby draw up the line 8, which will bring the pawl *m* in contact with the ratchet-wheel *n*, and thereby hold the brakes from off the wheels.

It will readily be seen, by reference to figs. 1 and 2, that my improved brakes can be operated by the ordinary hand-lever marked 21, and chain marked 22, which is attached to lever 18, by simply winding up the chain, (which is the ordinary mode of bringing up the brakes to bear on the wheels,) it will cause the rods, cranks, and levers to operate in the manner described, and thereby take the brakes off the wheels.

The brakes are brought to bear on the wheels by the tractive power of the spring upon shaft 11 and cranks *o* and *o'*, which are connected to the rods and levers which operate the brakes.

When the brakes are off the wheels, the cranks *o* and *o'* are in the position represented by the dotted line *g*, (see fig. 4,) and when the brakes are on the wheels, the cranks *o* and *o'* are in the position represented by *o* and *o'* in the same figure.

By thus arranging the cranks *o* and *o'*, with relation to the spring-shaft, a less power will hold the brakes from off the wheels than is required to draw them off, for the leverage of the cranks *o* and *o'* is gradually increased as they approach the position represented by the dotted lines *g*, seen in fig. 4, which is the position of the cranks when the brakes are held off from the wheels.

Having thus described the nature, construction, and operation of my improvement in brakes,

What I claim as of my invention, is—

1. The described arrangement of the cranks *o* and *o'* on the spring-shaft 11, of the improved brake, substantially as herein described and set forth.

2. The combination of the pawl *m* and ratchet-wheel *n* with the shaft 11, cranks *o* and *o'*, and coil-spring, combined, arranged, and operating substantially as herein described, and for the purpose set forth.

3. The combination and arrangement of the coil-spring shaft 11, cranks *o* and *o'*, rods *j*, *k*, *j'*, and *k'*, levers 18 and 16, and shaft *x*, with the rods *i i' h h'*, brake-bars *e*, and brakes *d*, constructed, combined, arranged, and operating as herein described.

4. The stirrups *g g*, constructed and arranged as herein described, to enclose and suspend the brake-bar.

JOHN DAVIS.

Witnesses:
GEO. H. THOMAS,
JAMES J. JOHNSTON.